D. D. CRAIG.
Improvement in Horse Powers.
No. 115,711.  Patented June 6, 1871.
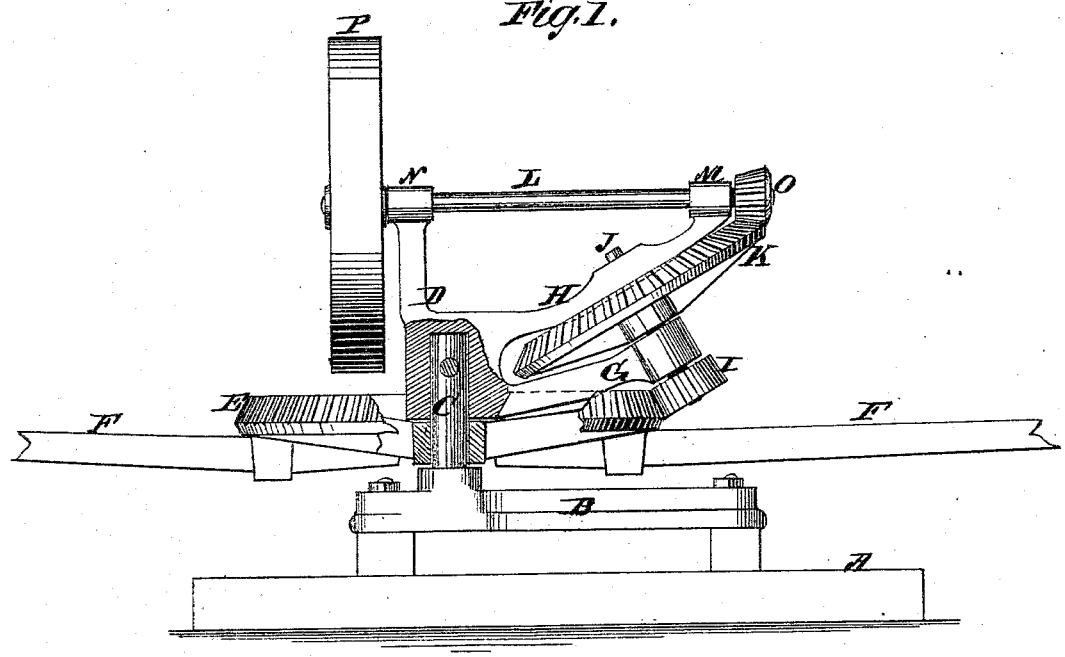
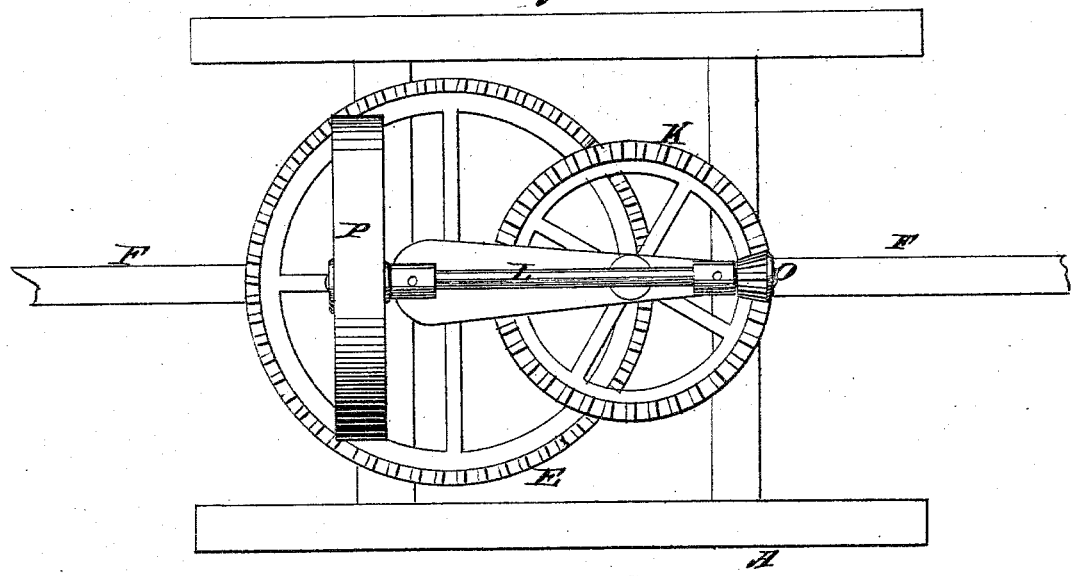
Witnesses:
John Becker.
Wm. H. C. Smith.
Inventor:
D. D. Craig.
Per Munn & Co.
Attorneys.

No. 115,711

UNITED STATES PATENT OFFICE.

DAVID D. CRAIG, OF MACON, GEORGIA.

IMPROVEMENT IN HORSE-POWERS.

Specification forming part of Letters Patent No. 115,711, dated June 6, 1871.

*To all whom it may concern:*

Be it known that I, DAVID D. CRAIG, of Macon, in the county of Bibb and State of Georgia, have invented a new and useful Improvement in Horse-Power; and I do hereby declare that the following is a full, clear, and exact description thereof, which will enable others skilled in the art to make and use the same, reference being had to the accompanying drawing forming part of this specification.

The object of this invention is to furnish a light, simple, and durable portable horse-power; and the invention consists in the construction and arrangement of parts hereinafter described.

In the accompanying drawing, Figure 1 represents a side view, partly in section, of my improved horse-power. Fig. 2 is a top or plan view.

Similar letters of reference indicate corresponding parts.

A is the frame, upon which the operating parts of the machine are supported, and which is preferably made of wood. B is the bed-plate, which is securely bolted to the frame to which the stud C is rigidly fastened, or of which it may form a part. D is the branch-stand, by which the gearing and band-wheel are directly supported. This stand is rigidly attached to the upper end of the stud C by a pin, as seen in Fig. 1. In the space between the stand and the bed-plate is a journal, around which the driving-wheel E revolves. This driving-wheel is slightly beveled, with its face upward. To its under side the driving-levers F, one or more, are fastened in such a manner that the power is applied directly to the rim of the wheel, the arrangement being plainly shown in the drawing. G is the lower branch of the stand D, and H is the upper branch. I is a pinion, which meshes into the driving-wheel, which is attached to the lower end of the inclined shaft J. K is a bevel-wheel on the same shaft. The shaft J is supported on suitable journals by the branches G and H. L is the band-wheel shaft, supported in a horizontal position by the branch H at *m*, and by the stand D at N. O is a pinion on the end of the band-wheel shaft which meshes into the bevel-wheel K. P is the band-wheel from which the machinery is driven.

From this arrangement it will be seen that the power is applied and the motion obtained in the most direct manner. The wheels and pinions are all beveled, which description of gearing is allowed to be superior to spur-gearing where strength and durability are required. For driving cotton-gins, and for many other purposes on the plantation, this horse-power is especially adapted. It is composed of few parts, and is light and portable.

Having thus described my invention, I claim as new and desire to secure by Letters Patent—

The frame A, bed-plate B, stud C, branch-stand D, driving-wheel E, bevel-wheel K, pinions I and O, shaft L, and band-wheel P, constructed, combined, and arranged to operate substantially as and for the purposes herein shown and described.

DAVID D. CRAIG.

Witnesses:
 HUGH McLEAN,
 J. M. BOARDMAN.